US009106033B2

United States Patent
Buettner et al.

(10) Patent No.: US 9,106,033 B2
(45) Date of Patent: Aug. 11, 2015

(54) BUSBAR ADAPTER

(71) Applicant: Woehner GmbH & Co. KG Elektrotechnische Systeme, Roedental (DE)

(72) Inventors: Alex Buettner, Roedental (DE); Christopher Curth, Neustadt (DE)

(73) Assignee: Woehner GmbH & Co. KG Elektrotechnische Systeme, Roedental (DE)

( * ) Notice: Subject to any disclaimer, the term of this patent is extended or adjusted under 35 U.S.C. 154(b) by 0 days.

(21) Appl. No.: 13/866,762

(22) Filed: Apr. 19, 2013

(65) Prior Publication Data

US 2013/0280930 A1    Oct. 24, 2013

(30) Foreign Application Priority Data

Apr. 20, 2012   (DE) .......................... 10 2012 206 597

(51) Int. Cl.
| | | |
|---|---|---|
| *H01R 25/14* | (2006.01) | |
| *H02B 1/21* | (2006.01) | |
| *H02B 1/056* | (2006.01) | |

(52) U.S. Cl.
CPC ................ *H01R 25/145* (2013.01); *H02B 1/21* (2013.01); *H02B 1/0565* (2013.01)

(58) Field of Classification Search
USPC ........................... 439/110, 114, 116, 121, 532
See application file for complete search history.

(56) References Cited

U.S. PATENT DOCUMENTS

| | | | | |
|---|---|---|---|---|
| 4,646,199 A | * | 2/1987 | M'Sadoques et al. ........ | 361/634 |
| 5,973,914 A | * | 10/1999 | Rose et al. .................... | 361/627 |
| 6,086,389 A | * | 7/2000 | Wagener ........................ | 439/114 |
| 6,164,988 A | | 12/2000 | Wagener | |
| 6,680,842 B1 | * | 1/2004 | Pelaez et al. .................. | 361/631 |
| 6,767,223 B2 | * | 7/2004 | Lostoski et al. ............. | 439/76.1 |
| 7,244,143 B2 | * | 7/2007 | Wagener ........................ | 439/532 |
| 7,448,885 B2 | * | 11/2008 | Wagener ........................ | 439/116 |
| 7,601,013 B2 | * | 10/2009 | Wagener et al. .............. | 439/110 |
| 2006/0035517 A1 | * | 2/2006 | Wagener ........................ | 439/532 |
| 2008/0146054 A1 | * | 6/2008 | Byrne ............................ | 439/110 |
| 2008/0220635 A1 | * | 9/2008 | Wagener et al. .............. | 439/114 |

(Continued)

FOREIGN PATENT DOCUMENTS

| | | |
|---|---|---|
| DE | 10061942 C1 | 5/2002 |
| DE | 10120006 A1 | 10/2002 |

(Continued)

OTHER PUBLICATIONS

Wohner GmbH & Co. KG Elektrotechnische Systeme, European Application No. 13164102.9, Extended European Search Report, Feb. 17, 2014.

(Continued)

*Primary Examiner* — Alexander Gilman
(74) *Attorney, Agent, or Firm* — Michael G. Johnston; Moore & Van Allen PLLC

(57) ABSTRACT

The invention relates to a busbar adapter comprising a housing for receiving at least one installation device for contacting the installation device with at least one busbar that can be held in the busbar adapter, characterized in that the busbar adapter comprises at least one symmetrically configured contact terminal for receiving and contacting a contact of the installation device with an associated busbar, and at least one symmetrically configured attachment device for attaching the installation device to the busbar adapter.

11 Claims, 2 Drawing Sheets

(56) References Cited

U.S. PATENT DOCUMENTS

Figure 1:
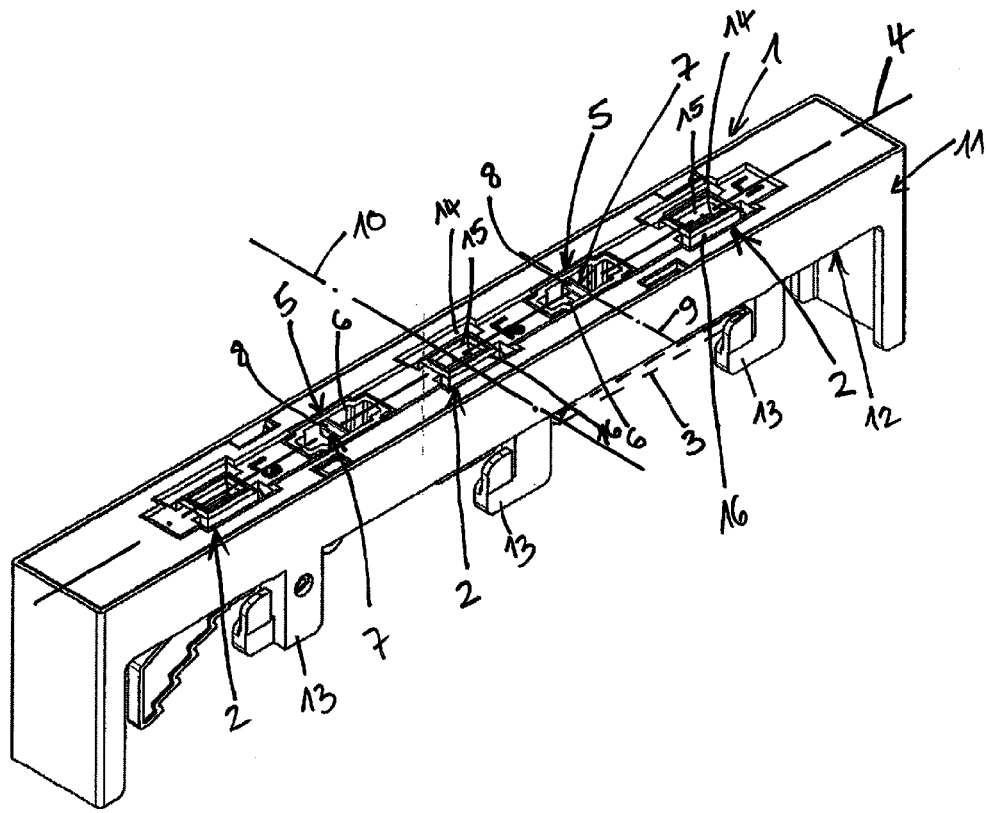

2009/0068866 A1* 3/2009 Sinclair et al. ............... 439/110
2010/0233893 A1* 9/2010 Buettner ...................... 439/121
2013/0280930 A1* 10/2013 Buettner et al. ............. 439/110

FOREIGN PATENT DOCUMENTS

| | | | |
|---|---|---|---|
| DE | 102006022374 | A1 | 11/2007 |
| DE | 102006048639 | A1 | 4/2008 |
| DE | 102007053535 | A1 | 5/2009 |
| DE | 102007061430 | B3 | 7/2009 |
| DE | 102011105373 | A1 | 12/2012 |
| DE | 102009045121 | B9 | 4/2013 |
| EP | 0926791 | B1 | 12/1998 |
| EP | 1253610 | A2 | 10/2002 |
| EP | 2026429 | A1 | 2/2009 |
| WO | 2006/027355 | A2 | 3/2006 |

OTHER PUBLICATIONS

Woehner Gmbh & Co. Kg Elektrotechnische Systeme, Chinese Application No. 2013102218891, Office Action, Apr. 3, 2015.

* cited by examiner

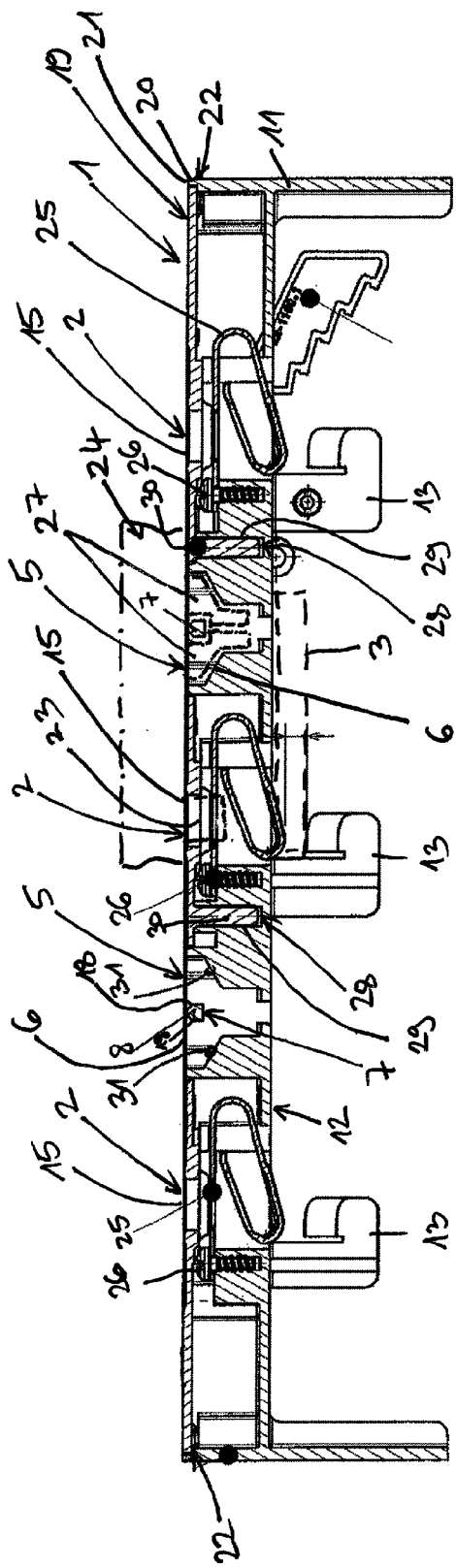
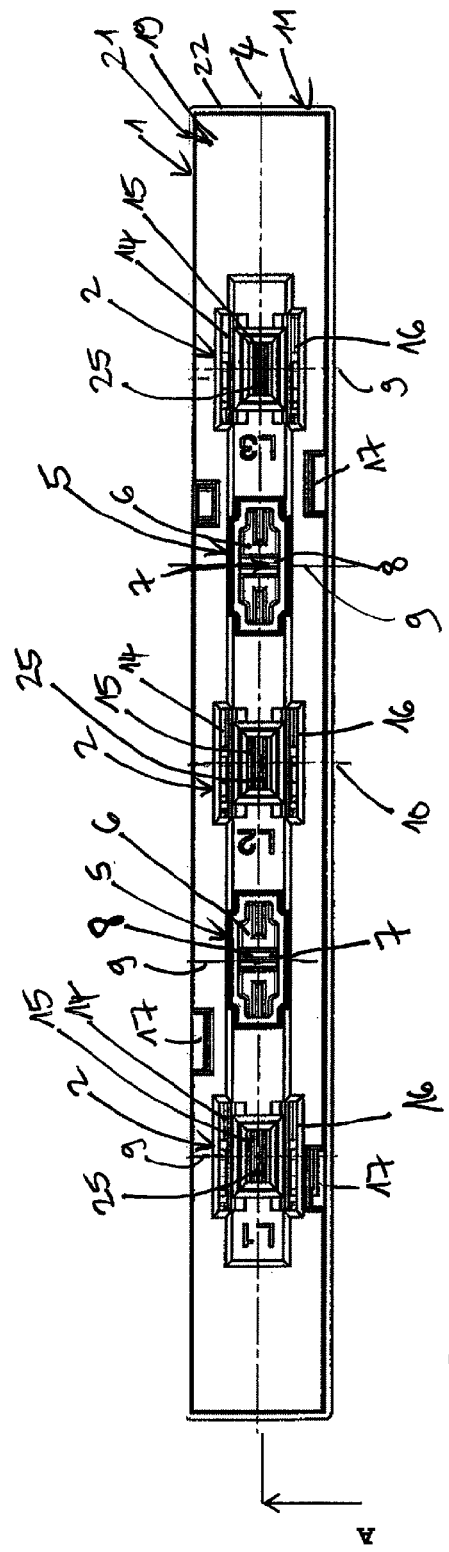
Fig. 3
Fig. 2

BUSBAR ADAPTER

A busbar adapter is described and claimed.

A busbar adapter is known, for example, from DE 100 61 942 C1. Said busbar adapter has a housing made of plastic, on the underside of which clamp feet are formed. The housing further comprises a base, from which the approximately L-shaped clamp feet project downward. The busbar adapter contains an opening in the region of each clamp foot and is designed for use in busbars of various widths and strengths, and in terms of a simple assembly, is designed such that an approximately U-shaped foot is inserted into the opening. The base of the U-shaped foot is arranged at right angles in the housing, wherein a contact unit consisting of an approximately U-shaped metal spring and an approximately U-shaped copper contact is inserted between the two arms of the foot.

In general, busbar adapters are used for producing contact between busbars and electrical devices. Such busbar adapters consist of a housing with clamp feet projecting downward, which are used for clamping the busbar adapter in relation to the associated busbars. In so doing, contacts are produced in the region of the clamp feet, which establish contact with the respective busbar once the busbar adapter has been pushed on, thereby producing the current path within the busbar adapter to output terminals.

There is a need for a busbar adapter which will permit an improved configuration of an installation device.

According to one embodiment, a busbar adapter is provided, which comprises a housing for accommodating at least one installation device for the purpose of contacting said installation device to at least one busbar that can be held in the busbar adapter, wherein the busbar adapter comprises at least one symmetrically shaped contact terminal for receiving and contacting a contact of the installation device with an associated busbar, and at least one symmetrically shaped attachment device for attaching an installation device to the busbar adapter.

This configuration offers the advantage that the installation device can also be arranged displaced 180° on the busbar adapter.

Additional embodiments of the busbar adapter are specified in dependent claims herein.

According to one preferred embodiment, the at least one contact terminal and the at least one attachment device are arranged on a shared longitudinal axis.

In a further preferred embodiment, the at least one contact terminal is embodied as mirror symmetrical to its transverse axis and its longitudinal axis. This allows an installation device to also be easily accommodated in the contact terminal, rotated by 180°. This is also true if the at least one attachment device is embodied as mirror symmetrical to its transverse axis and its longitudinal axis. In this case, the installation device can also be held and attached in the attachment device displaced by 180°.

In another preferred embodiment, the attachment device has an opening in the busbar adapter for receiving a part of the installation device. In this case, at least one side wall of the opening has a bevel that is directed downward, for example. The bevel further facilitates the insertion and positioning of the installation device in the attachment device.

In a further preferred embodiment, the attachment device has at least one retaining device for attaching the installation device. The retaining device is a retaining land, for example. In this case, a retaining device enables a particularly simple attachment of the installation device by latching with the retaining device. For example, the installation device can snap in or behind the retaining land from both sides.

According to another preferred embodiment, the retaining land extends transversely through the opening in the attachment device, preferably transversely through the center of the opening. The retaining land is further embodied as having a bevel that is directed downward on at least one side, for example. This further simplifies the positioning and snapping of the installation device into the attachment device.

In a further preferred embodiment, the installation device can be snapped into the retaining land from at least one side. This results in a particularly simple and cost-effective attachment of the installation device to the busbar adapter, without requiring that the installation device be securely screw-connected to the busbar adapter, for example.

According to another preferred embodiment, the contact terminal has at least one terminal for receiving a plug-type contact of the installation device. The contact of the busbar adapter for contacting the plug-type contact is a contact spring, for example. In place of a plug-type contact and a contact spring, any other type of contacting between the busbar adapter and the installation device that is suitable for electrically contacting the installation device with a busbar accommodated in the busbar adapter is also possible.

In a further preferred embodiment, the busbar adapter has at least one guide device for pre-positioning the installation device on the busbar adapter. The guide device is embodied as a guide slot in the busbar adapter, for example.

According to one preferred embodiment, the guide device is embodied to receive and guide a part of the installation device before the contact element, e.g., the plug-type contact, of the installation device is partially or entirely received in the contact terminal. This allows the installation device to be pre-positioned on the busbar adapter prior to actual contacting with the contact of the busbar adapter.

Figure 4:
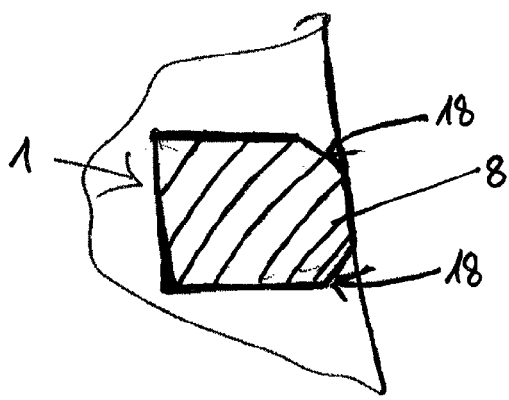

In what follows, the busbar adapter will be described in reference to the set of drawings, for the purpose of specifying additional features. The drawings show:

FIG. 1 is a perspective view of a busbar adapter according to one embodiment of the invention, FIG. 2 is a plan view of the busbar adapter according to FIG. 1, FIG. 3 is a sectional view A-A of the busbar adapter according to FIG. 2, and FIG. 4 is a section of a retaining land of the busbar adapter, in a sectional view.

FIG. 1 shows a perspective view of a busbar adapter 1 according to one embodiment of the invention. The busbar adapter 1, as shown in the embodiment example illustrated in FIG. 1, for example, comprises three contact terminals 2 for receiving and contacting one or more installation devices (not shown). Examples of such installation devices include open-phase circuit breakers, contactors or other electrical devices, which are electrically contacted to busbars 3 of the busbar adapter 1. A busbar 3 is indicated in FIG. 1 in highly simplified form by a dashed line.

In this case, the contact terminals 2 are preferably arranged in a row and in the embodiment example illustrated in FIG. 1 lie on a shared longitudinal axis 4.

In addition, an attachment device 5 or an attachment matrix is provided between two contact terminals 2, for the purpose of attaching an installation device to the busbar adapter 1. The respective attachment device 5 further has an opening 6 in the busbar adapter 1. The opening 6 is shaped for accommodating a part, e.g. a retaining element, of an associated installation device. In the embodiment example shown in FIG. 1, the attachment device 5 has a retaining device 7, for example, in the form of a retaining land 8. The retaining land 8 extends, for example, along the transverse axis 9 of the opening 6 or of the attachment device 5. The retaining land 8 is embodied such that a retaining element of the installation device can snap in or behind said land. This allows the installation device to be attached in the opening 6 on the busbar adapter 1.

The two attachment devices 5 are arranged symmetrically to one another between the contact terminals 2. This symmetrical arrangement of the attachment devices 5 allows an installation device to also be positioned on the busbar adapter 1, rotated by 180°, and secured in the attachment devices 5.

In this case, the respective attachment device 5, as illustrated in the embodiment example of FIG. 1, is also symmetrical in construction. The axes of symmetry of the attachment device 5 are the transverse axis 9 and the longitudinal axis 4 thereof. The attachment devices 5 lie on a shared longitudinal axis 4 with the contact terminals 2, for example. Additionally, the attachment devices 5 and the contact terminals 2 in the embodiment example shown in FIG. 1 are embodied as mirror symmetrical to the shared longitudinal axis 4. The longitudinal axis 4 forms the mirror axis of both the contact terminals 2 and the attachment devices 5. Moreover, the contact terminals 2 and the attachment devices 5 are also embodied as mirror symmetrical to a transverse axis. In the embodiment example shown in FIG. 1, the contact terminals 2 and the attachment devices 5 are formed to the transverse axis 10 of the center contact terminal 2.

As is shown in FIG. 1, the busbar adapter 1 comprises a housing 11 made of plastic, for example, on the underside 12 of which clamp feet 13 are provided in the region of the contact terminals 2. In FIG. 1, for example, a three-phase busbar adapter 1 is shown, which has three clamp feet 13. The clamp feet 13 have an essentially L-shaped form, for example.

As shown in the embodiment example of FIG. 1, each of the contact terminals 2 has three openings 14, 15, 16, for example, each of which serves to receive a contact element, for example, a plug-type contact of an associated installation device. The plug-type contact is in turn connected to a contact, for example, a contact spring, in the region of the clamp feet 13, in order to electrically contact the installation device to the respective busbar 3 once the busbar adapter 1 has been pushed on.

The housing 11 further comprises a plurality of guide devices 17 for receiving and guiding a respectively assigned guide element of an installation device. The guide devices 17 in the embodiment example shown in FIG. 1 are embodied as guide slots 17. A guide element in the form of a corresponding projection of the installation device can be received in the respective guide slot 17. During positioning of a respective installation device, the position is predefined by the guide element or guide elements thereof. These guide elements are received and guided in the corresponding guide devices 17 of the busbar adapter 1. In the embodiment example illustrated in FIG. 1, the guide elements of the installation device project into the assigned guide slots 17 on the busbar adapter 1, before plug-type contacts of the installation device enter into the contact terminals 2 of the busbar adapter 1 and mechanical locking takes place. In the guided position, the retaining element of the installation device slides across a bevel 18 of the retaining land 8 of the assigned attachment device 5, until it ultimately encompasses the retaining land 8 and snaps behind it. The snapping behind or snapping in of the installation device on the busbar adapter 1 is supported by the beveled retaining lands 8.

FIG. 2 shows a plan view of the busbar adapter 1 according to FIG. 1. The contact terminals 2 and the attachment devices 5, as described above, are arranged on a shared longitudinal axis 4 and are mirror symmetrical thereto. Moreover, the contact terminals 2 and the attachment devices 5 are also symmetrical to the transverse axis 10 of the center contact terminal 2.

The guide slots 17 are formed, for example, in a cover element 19 of the housing 11 and terminate at a peripheral wall 20 of the housing 11. The shape of the guide slots 17 is designed for receiving an associated guide element, e.g., a projection, of the installation device and for guiding and positioning said guide element to a predefined position in the busbar adapter 1.

FIG. 3 further illustrates a cross-sectional view A-A of the busbar adapter 1 according to FIG. 2.

As is clear from FIG. 3, the housing 11 of the busbar adapter 1 comprises a first cover holder 22 on its upper side 21, for example, in the form of a continuous recess designed for receiving the cover element 19. In this case, the guide slots 17, which terminate at the peripheral wall 22 of the housing 11 on the outer side thereof, are formed in the cover element 11.

The cover element 19 further comprises the respective openings 14, 15, 16 of the contact terminal 2 for insertion of a plug-type contact 23 of an associated installation device 24 into the contact terminal 2. The installation device 24 and its plug-type contact 23 are indicated in highly simplified form and purely schematically in FIG. 3 by a dotted-dashed line.

The plug-type contact 23 establishes contact with the contact, e.g. a contact spring 25, of the busbar adapter 1 arranged below the openings 14, 15, 16 of the contact terminal 5. In this manner, an installation device 24 can be electrically connected to the contact 25 of the busbar adapter 1 when a busbar 3 is inserted into the busbar adapter 1. As described above, clamp feet 13 are arranged on the underside 12 of the housing 11. A busbar 3 is inserted between the respective clamp foot 13 and the associated contact 5 of the busbar adapter 1. The busbar 3 is indicated in FIG. 3 in highly simplified form and purely schematically by a dashed line.

The contact spring 25 as a contact is detachably connected at one end to the housing 11, e.g., screw-connected by means of a screw 26 as illustrated in the embodiment example in FIG. 3. The contact spring 25 is covered from the top by the cover element 19 and is uncovered in the region of the openings 14, 15, 16 of the contact terminal 2 in the cover element 19, to allow the plug-type contact 23 of an installation device 24 to be inserted through the openings 14, 15, 16 in the contact terminal 2 and contacted with the contact spring 25 beneath this.

The housing 11 further comprises the attachment devices 5 for receiving one or more installation devices 24. The attachment devices 5 are each embodied with one opening 6 in the housing 11. The cross-section of the respective opening 6 tapers, for example, in the longitudinal direction of the opening 6. As illustrated in the embodiment example of FIG. 3, the opening 6 has a conically tapered section, for example, with a bevel 31 that extends downward.

Furthermore, an additional retaining device 7 is provided in the opening 6 of the attachment device 5. The retaining device 7 has a retaining land 8, for example, which extends transversely in the opening 6, preferably transversely through the center of the opening or along the diameter of the opening. The retaining land 8 can be embodied on its upper side and optionally also on one or both sides as having a bevel 18 or as beveled downward, as is also illustrated in the section of the retaining land 8 in the subsequent FIG. 4.

The symmetrical configuration of the respective attachment device 5 allows the retaining element 27 of an installation device 24 to be received from both sides on the retaining land 8 and to snap in or snap behind said land. The snapping in or behind is additionally supported by the beveled retaining land 8. In principle, it is also conceivable for the attachment device 5 with its opening 6 and the retaining land 8 to be formed in the cover element 19 and inserted into the housing 11 (not shown).

For additionally securing and fastening the cover element 19 in the housing 11, the housing 11 optionally also has a second cover holder 28, in which the cover element 19 can be received and positioned. The second cover holder 28 is arranged, for example, in the region of the clamp feet 13, which extend outward from the underside 12 of the housing 11. The second cover holder 28 has one or more recesses 29, into which a corresponding projection 30 of the cover element 19 can be inserted or received. The cover element 19 lies, for example, with its underside on the upper side of the recess, so as to be additionally supported against the housing 11.

FIG. 4 shows a section of a retaining land 8 of the busbar adapter 1 according to FIG. 3 in a sectional view. The retaining land 8 is provided on both sides of its top side with bevels 18 directed downward, or is beveled. This allows a retaining element of an installation device to snap in or snap behind the retaining land 8 from both sides. The beveled sides additionally facilitate the insertion and snapping-in of the retaining element.

LIST OF REFERENCE SIGNS

1 Busbar adapter
2 Contact terminal
3 Busbar
4 Longitudinal axis
5 Attachment device
6 Opening (attachment device)
7 Retaining device
8 Retaining land
9 Transverse axis (attachment device)
10 Transverse axis (center contact terminal)
11 Housing
12 Underside
13 Clamp foot
14 Opening (contact terminal)
15 Opening (contact terminal)
16 Opening (contact terminal)
17 Guide device
18 Bevel (retaining land)
19 Cover element
20 Peripheral wall
21 Upper side
22 First cover holder
23 Plug-type contact
24 Installation device
25 Contact spring
26 Screw
27 Retaining element
28 Second cover holder
29 Recess
30 Projection
31 Bevel (opening of the attachment device)

We claim:

1. A busbar adapter for securing in a contacting relationship a busbar and an installation device including a retaining element and at least one plug-type contact, the busbar adaptor comprising:

a housing for accommodating at least one installation device and at least one busbar for contacting the installation device with the busbar;

at least one symmetrically configured contact terminal disposed on the housing, the contact terminal adapted to be operatively connected to the at least one busbar for receiving and contacting the plug-type contact of the at least one installation device with the at least one busbar; and at least one symmetrically configured attachment device for attaching the at least one installation device to the busbar adapter, the attachment device disposed on the housing adjacent to the contact terminal and having an opening and at least one retaining device comprising a retaining land extending transversely across the opening in the attachment device, wherein the installation device is adapted to be snapped from at least one side of the housing onto the retaining land.

2. The busbar adapter according to claim 1, wherein the at least one contact terminal and the at least one attachment device are arranged on a shared axis of the busbar adapter.

3. The busbar adapter according to claim 1, wherein the at least one contact terminal is embodied as mirror symmetrical to its transverse axis and its longitudinal axis.

4. The busbar adapter according to claim 1, wherein the at least one attachment device is embodied as mirror symmetrical to its transverse axis and its longitudinal axis.

5. The busbar adapter according to claim 1, wherein the opening of the attachment device is adapted for receiving the retaining element of the installation device, and wherein at least a portion of the attachment device defining the opening has a bevel that is directed downward.

6. The busbar adapter according to claim 1, wherein the retaining land has a bevel that is directed downward on at least one side.

7. The busbar adapter according to claim 1, wherein the contact terminal comprises at least one terminal for receiving the plug-type contact of the installation device, and wherein the contact terminal comprises a contact spring for contacting the plug-type contact of the installation device.

8. The busbar adapter according to claim 1, further comprising
at least one guide device for pre-positioning the installation device on the busbar adapter, wherein the guide device is a guide slot defined in the housing.

9. The busbar adapter according to claim 8, wherein the guide device is configured for accommodating and guiding a part of the installation device before the plug-type contact of the installation device is partially or entirely held in the contact terminal.

10. The busbar adapter according to claim 1, wherein the housing comprises a cover element disposed on the upper side of the housing, and wherein the cover element is held in a first cover element holder of the housing, wherein the first cover element holder is a recess defined in the peripheral wall of the housing.

11. The busbar adapter according to claim 10, wherein the housing has a second cover element holder, wherein the second cover element holder is at least one recess defined in the housing in which a projection of the cover element can be received.

* * * * *